Oct. 6, 1925.
G. C. GOODHART
1,556,101
DIFFERENTIAL GEARING
Filed Sept. 8, 1920   3 Sheets-Sheet 1
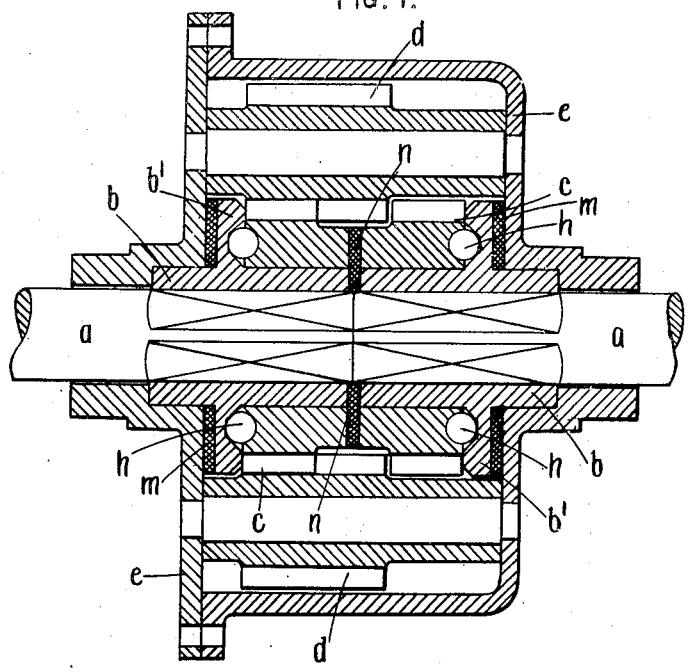
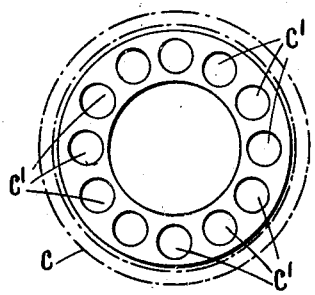
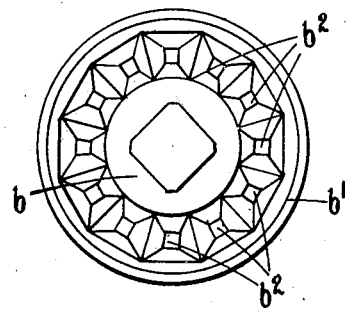

Oct. 6, 1925.
1,556,101

G. C. GOODHART

DIFFERENTIAL GEARING

Filed Sept. 8, 1920     3 Sheets-Sheet 2

INVENTOR
Gavin Caird Goodhart.
per Robert O. Phillips.
Attorney.

Oct. 6, 1925.

G. C. GOODHART 1,556,101

DIFFERENTIAL GEARING

Filed Sept. 8, 1920

INVENTOR
Gavin Caird Goodhart.
per. Robert E. Phillips
Attorney

Patented Oct. 6, 1925.

1,556,101

UNITED STATES PATENT OFFICE.

GAVIN CAIRD GOODHART, OF INKPEN, ENGLAND.

DIFFERENTIAL GEARING.

Application filed September 8, 1920. Serial No. 409,012.

*To all whom it may concern:*

Be it known that I, GAVIN CAIRD GOODHART, a subject of the King of Great Britain and Ireland, residing at Willows, Inkpen, in the county of Berks, England, have invented certain new and useful Improvements in Differential Gearing, of which the following is a specification.

This invention relates to differential gearing of the epicyclic type in which the differential action is restricted by internal friction and is especially adapted for use in mechanically propelled vehicles to prevent either of the driving road wheels having an independent rotary movement owing to want of adhesion on the road surface and yet allow the gearing to function in the usual manner when the vehicle is running on curves, and it has for its object the production in such a type of differential gear of the necessary internal friction by the creation of end thrust due to the driving torque without materially increasing the size of the gear. A further object of this invention is to avoid the use of additional gear wheels or a multiplicity of additional parts or the use of gear wheels having teeth of special or unusual shape. A still further object of this invention is to balance the internal pressures.

I attain these ends by mounting the driven wheels of the gear, which are in gear with the driving wheels carried by the driving member or housing, loosely in relation to the two parts of the driven axle, and by interposing either directly or indirectly between each of said driven wheels and the driving member a friction device, and between each of said driven wheels and each of said parts of said driven axle a coupling device which has the characteristic firstly that relative rotary motion due to the torque between each of said driven wheels and each of said parts of the driven axle in either direction imparts axial movement and thrust to any given element of the friction device in one direction only, whereby increased friction due to the axial thrust is set up and the sensitiveness of the gear as a whole is materially reduced, and secondly that the increased axial thrust due to the said coupling device and the consequent engagement of the friction device is effective both when the gear is differentiating and when it is not differentiating.

In the accompanying drawing which illustrates this invention:—

Fig. 1 is a view in longitudinal section of a differential gear of the spur wheel type embodying this invention.

Figs. 2 and 3 are views in end elevation of one of the driven members of the gear and of one of the driving elements respectively showing the construction of the coupling devices.

Throughout the views similar parts are marked with like letters of reference.

Figure 4:
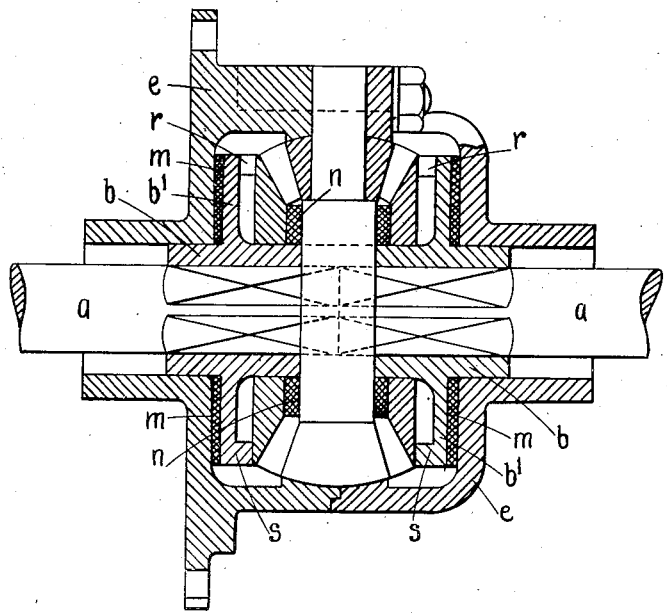
Fig. 4 is a view in longitudinal section of a differential gear of the bevel wheel type embodying this invention.

Referring to Figs. 1, 2 and 3. One the abutting ends of the two parts $a$ and $a$ of the driven axle are mounted—so as to be free to slide axially thereon but to rotate therewith—sleeves $b$ and $b$ each having a radial flange $b'$ located at or near its outer end. On the inner end of each sleeve $b$ is loosely mounted—so as to be free both to slide axially thereon and to rotate independently thereof—a pinion $c$ forming one of the driven members of the gearing which is of the usual construction and comprises in addition to the driven pinions $c$ driving pinions $d$ carried by a cage or case $e$ to which the driving power is applied and intermediate pinions not shown in the drawing which gear with the pinions $d$ and $c$.

In the face of each of the pinions $c$ opposed to the flange $b'$ of the intermediate sleeve $b$ are a series of recesses $c'$ in each of which is a ball $h$. These balls stand proud of the face of the pinion and are adapted to engages recesses $b^2$ in the face of the flange $b'$ said recesses $b^2$ being shaped to form circumferentially arranged inclined planes. Between the outer faces of the flanges $b'$ and the sides of the cage or case $e$ with which they engage are interposed washers $m$ of any suitable frictional material and similar washers $n$ are interposed between the abutting inner faces of the pinions $c$ of the gearing. If desired the recesses $c'$ in the pinions $c$ can also be shaped to form inclined planes.

The action of this improved gearing is as follows:—When the driving torque is applied to the pinions $c$ the balls $h$ will attempt to climb up the inclined sides of the recesses $b^2$ in the flanges $b'$ of the sleeves $b$ and in so doing will impart axial movement to said sleeves thereby creating pressure due to end thrust on the friction washers $m$ and $n$ said pressure being in definite proportion to the driving torque and said proportion depending on the angle of the inclined sides of the recesses $b^2$.

Figure 5:
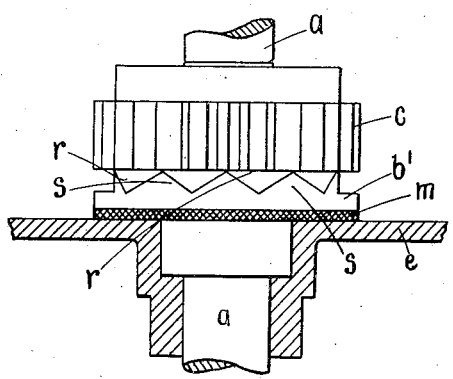
Fig. 5 is a view in plan of one of the driven members and one of the driving elements showing the coupling device employed in the construction shown in Fig. 4.

Instead of employing balls and inclined recesses to convert the rotary motion of the driven members of the gear into axial movement of the driving elements interengaging inclined teeth or dogs $r$ and $s$ may be formed on the abutting faces of the pinions $c$ and of the flanges $b'$ of the driving elements $b$ as shown in Figs. 4 and 5.

Figure 6:
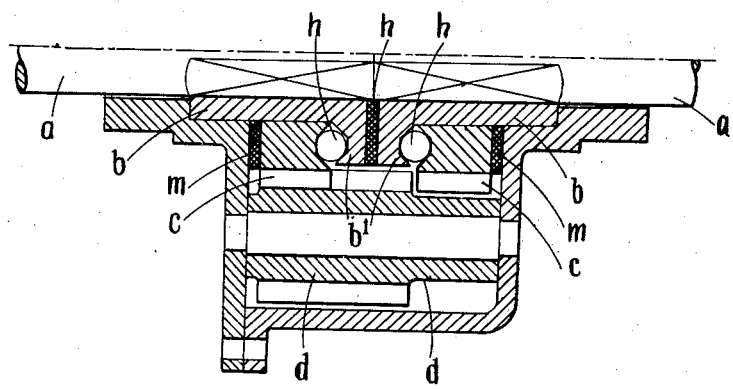
Fig. 6 is a view in half longitudinal section showing a modification as applied to a differential gear of the spur wheel type.

Alternative to the aforesaid constructions the flanges $b'$ may be located at the inner ends of the sleeves $b$ and the recesses in the pinions $c$ or the inclined teeth or dogs carried thereby may be arranged in or on the inner faces of said members instead of in or on the outer faces thereof as shown in Fig. 6.

Owing to the very limited amount of relative axial movement required between the driven members of the gear and the driving elements said driving elements may be fixed on the two parts of the driven axle when said parts of said axle are mounted in such a manner as to provide for the necessary relative axial movement.

Instead of coupling both of the driven elements of the gear to the two parts of the driven axle as before provided only one may be so coupled—the other being fixed to its shaft in the usual manner—provided that the frictional surface or surfaces are correspondingly increased.

Figure 7:
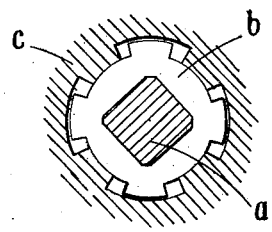
Fig. 7 is a view in transverse section showing the preferred method of mounting the driven members of the gear.

In order that the gear may continue to function in case the frictional surfaces become destroyed or worn out the driven members $c$ of the gear may be so mounted on the sleeves $b$ that there is only a predetermined amount of relative angular movement between said parts as shown in Fig. 7.

What I claim is:—

1. In differential gearing of the class described and in combination with a rotatable housing, and means for driving the same; differential pinion mechanism rotatable with said housing; two driving gears driven by said pinion mechanism; two driving axles driven one by each of said driving gears; and two locking devices associated one with each of said driving axles and acting to lock the same relative to said housing so as to rotate in unison therewith each locking device comprising a driving member operatively connected with a driving axle; two cams carried one by said driving member and the other by one of the driving gears aforesaid, and which cams act to force said driving member and driving gear apart; and co-operating friction surfaces which are forced into engagement with one another by the action of said cams.

2. In an apparatus of the kind described, the combination of a shaft section, differential gear casing, a sleeve upon said axle section adapted to frictionally engage said casing, a driving part for said axle section having angular motion relative thereto and a double cam interposed between said driving part and said frictionally-engaging part and directly engaging the parts between which it is interposed in one direction with relative motion in either direction.

3. In a differential gearing, a housing, a set of pinion gears within the housing, a set of mating gears within the housing meshing with the pinion gears, the mating gears having housing engaging clutch faces, axle members upon which the mating gears are sleeved, and co-operating cams on the exteriors of the axle members and on the ends of the mating gears distant from the clutch faces.

4. In a differential gear, a driving member adapted to be mounted on the axle to be driven, driving gears carried by said driving member, driven gears loosely mounted on the two parts of the axle to be driven and gearing with said driving gears, friction clutch members mounted on each of the two parts of the axle to be driven and co-operating with said driving member, and means interposed between said driven gears and said friction clutch members by which relative rotary movement due to the torque in either forward or reverse direction produces axial thrust on said friction clutch members in a constant direction thereby setting up increased friction which operates to reduce the sensitiveness of the gear.

5. In a differential gear, a driving member adapted to be mounted on the axle to be driven, friction clutch members adapted to be mounted on the two parts of said axle and co-operating axially with said driving member, driving gears carried by said driving member, a set of driven gears gearing with said driving gears, and couplings between said driven gears and said clutch members by means of which rotary motion is imparted from said driven members to the driven axle through said clutch members the relative rotary movement between said driven gears and said friction clutch members in either forward or reverse direction producing axial thrust on said friction clutch members in a constant direction which sets up increased friction and thereby reduces the sensitiveness of the gear.

6. In a differential gear, a driving member adapted to be mounted on the divided driven axle, driving gears carried by said driving member, driven gears gearing with said driving gears, sleeves mounted on the two parts of the driven axle in such a manner that each has free relative axial movement but no relative rotary movement, friction clutch elements carried by said sleeves and co-operating with the driving member, and a coupling device operating by relative rotary movement between each of said driven gears and each of said sleeves said relative movement in either direction producing axial thrust on the friction clutch elements in a constant direction.

7. In a differential gear, the combination with the two part axle to be driven, of a driving member adapted to be mounted on the axle to be driven, driving gears carried by said driving member, sleeves mounted on the parts of said driven axle in such a manner that they have free axial movement thereon but no independent rotary movement, driven gears mounted on said sleeves so that they have a predetermined amount of free rotary movement relative to said sleeves and gearing with the driving gears carried by the driving member, friction clutch elements carried by said sleeves and co-operating with the driving member, and a coupling device operating by relative rotary movement between each of said driven gears and each of said sleeves said relative movement in either direction producing axial thrust in the friction clutch elements in a constant direction.

8. In a differential gear, the combination with the two part axle to be driven, of a driving member adapted to be mounted on the axle to be driven, driving gears carried by said driving member, sleeves mounted on the parts of said driven axle in such a manner that they have free axial movement thereon but no independent rotary movement, driven gears mounted on said sleeves so that they have a predetermined amount of free rotary movement relative to said sleeves and gearing with the driving gears carried by the driving member, friction clutch elements carried by said driving gears and co-operating with the driving member, and a coupling device operating by relative rotary movement between each of said driven gears and each of said sleeves said relative movement in either direction producing axial thrust in the friction clutch elements in a constant direction.

9. In a differential gear, the combination with the two part axle to be driven, of a driving member adapted to be mounted on the axle to be driven, driving gears carried by said driving member, sleeves mounted on the parts of said driven axle in such a manner that they have free axial movement thereon but no independent rotary movement, driven gears loosely mounted on said sleeves and gearing with the driving gears carried by the driving member, flanges carried by said sleeves, frictional members located between said flanges and the driving member and between the driven gears, and axially operating coupling devices between the driven gears and the flanges carried by the sleeves which operate by the relative movement between said driven gears and the sleeves carrying said flanges to impart driving movement to the two parts of the driven axle the axial movement of said coupling devices setting up increased friction between said flanges and the driving member and between the driven gears thereby decreasing the sensitiveness of the gearing.

10. In a differential gear, the combination with the two part axle to be driven, of a driving member adapted to be mounted on the axle to be driven, driving gears carried by said driving member, sleeves mounted on the parts of said driven axle in such a manner that they have free axial movement thereon but no independent rotary movement, driven gears loosely mounted on said sleeves so that they have a predetermined amount of free rotary movement relative to said sleeves and gearing with the driving gears carried by the driving member, flanges carried by said sleeves, frictional members located both between said flanges and the driving member and between the two driving gears carried by the driving member, and axially operating coupling devices between the driven gears and the flanges carried by the sleeves which operate by the relative movement between said driven gears and the sleeves carrying said flanges to impart driving movement to the two parts of the driven axle the axial movement of said coupling devices setting up increased friction between said flanges and the driving member and between the driven gears thereby decreasing the sensitiveness of the gearing.

11. A differential gear comprising a driving member mounted on the axle to be driven, driving gears carried by said driving member, sleeves adapted to be mounted on the two parts of the driven axle so as to have the same rotary movement, driven gears loosely mounted on said sleeves and gearing with the driving gears, friction elements carried by said sleeves and adapted to co-operate with the driven member, and coupling means operating axially between said driven gears and said sleeves by reason of relative rotary movement between said parts to effect a driving couple between said driven gears and the two parts of the driven axle and at the same time force the friction elements into contact with the driving member and thus create increased internal friction the construction and arrangement being such that the torque and consequent relative rotary movement between the driven gears and the sleeve in either direction causes axial thrust on the friction surfaces in one and the same direction.

12. A differential gear comprising a driving member mounted on the axle to be driven, driving gears carried by said driven member, sleeves adapted to be mounted on the two parts of the driven axle so as to have the same rotary movement, driven gears loosely mounted on said sleeves and gearing with the driving gears, friction elements carried by said sleeves and adapted to co-operate with the driving member, and coupling means between said driven gears and said sleeves whereby the torque and consequent relative rotary movement of said gears in either direction sets up axial thrust in one and the same direction said axial thrust operating to set up increased friction between the driving member and the two parts of the driven axle through the sleeves mounted thereon.

13. In a differential gear the combination of a two-part axle, sleeves mounted on the inner ends of the parts of said axle so that they partake of the rotary movements of the parts of said axle but are free to slide axially on same, a housing independently mounted on said axle, frictional members between said sleeves and said housing, a driven pinion loosely mounted on each of said sleeves, driving pinions carried by the housing and gearing with the driven pinions, and inter-engaging inclined planes on the opposed faces of the bosses of the driven pinions and of said sleeves.

14. The combination with a differential gear of the epicyclic type, comprising a driving member adapted to be mounted on the axle to be driven and carrying the driving pinions and two driven pinions adapted to be mounted on the two parts of the axle to be driven and gearing with said driving pinions; of driving elements interposed between said driven pinions and said two parts of the axle to be driven, said driven pinions having independent rotary motion with respect to said driving elements and said driving elements having free axial movement in relation to the two parts of the axle; frictional surfaces on said driving elements and said housing; and means for bringing said frictional surfaces into contact by the relative rotary movement between said driving pinions and said driving elements.

GAVIN CAIRD GOODHART.